United States Patent
Lee et al.

(10) Patent No.: US 9,549,395 B2
(45) Date of Patent: Jan. 17, 2017

(54) METHOD FOR DYNAMIC ALLOCATION OF RADIO RESOURCES IN WIRELESS COMMUNICATION SYSTEM AND DEVICE THEREFOR

(71) Applicant: LG ELECTRONICS INC., Seoul (KR)

(72) Inventors: Seungmin Lee, Anyang-si (KR); Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/390,712

(22) PCT Filed: Apr. 30, 2013

(86) PCT No.: PCT/KR2013/003745
§ 371 (c)(1),
(2) Date: Oct. 3, 2014

(87) PCT Pub. No.: WO2013/165160
PCT Pub. Date: Nov. 7, 2013

(65) Prior Publication Data
US 2015/0055584 A1    Feb. 26, 2015

Related U.S. Application Data

(60) Provisional application No. 61/640,012, filed on Apr. 30, 2012.

(51) Int. Cl.
*H04W 72/04*    (2009.01)
*H04L 5/00*    (2006.01)

(52) U.S. Cl.
CPC ............ *H04W 72/0413* (2013.01); *H04L 5/00* (2013.01); *H04W 72/042* (2013.01); *H04W 72/0446* (2013.01)

(58) Field of Classification Search
None
See application file for complete search history.

(56) References Cited

U.S. PATENT DOCUMENTS

2009/0274120 A1* 11/2009 Chou ...................... H04L 5/003
370/331
2011/0149813 A1* 6/2011 Parkvall ............... H04B 7/2656
370/280

(Continued)

FOREIGN PATENT DOCUMENTS

CN         102187725        9/2011
KR    10-2010-0130141       12/2010

(Continued)

OTHER PUBLICATIONS

PCT International Application No. PCT/KR2013/003745, Written Opinion of the International Searching Authority dated Aug. 12, 2013, 18 pages.

(Continued)

*Primary Examiner* — Diane Lo
(74) *Attorney, Agent, or Firm* — Lee Hong Degerman Kang Waimey

(57) ABSTRACT

The present invention relates to a method for transmitting an uplink signal of a terminal using multiple component carriers in a wireless communication system and, more particularly, to a method for transmitting an uplink signal of a terminal using multiple component carriers in a wireless communication system which supports carrier aggregation, comprising the steps of: receiving setting information on a second-type component carrier from a base station through a first-type component carrier; and transmitting an uplink signal to the base station through the second-type component carrier, wherein the use of the second-type component carrier for a specific subframe is changed according to the setting information.

7 Claims, 11 Drawing Sheets

(56) References Cited

U.S. PATENT DOCUMENTS

2013/0176952 A1* 7/2013 Shin .................. H04L 5/001
                                                   370/329
2013/0194931 A1* 8/2013 Lee .................. H04L 5/0053
                                                   370/241

FOREIGN PATENT DOCUMENTS

| KR | 10-2012-0029962 | 3/2012 |
|----|-----------------|--------|
| WO | 2011/040852     | 4/2011 |
| WO | 2011/065797     | 6/2011 |
| WO | 2011/115463     | 9/2011 |
| WO | 2012036406      | 3/2012 |

OTHER PUBLICATIONS

PCT International Application No. PCT/KR2013/003745, Written Opinion of the International Searching Authority dated Aug. 12, 2013, 13 pages.

The State Intellectual Property Office of the People's Republic of China Application Serial No. 201380022887.8, Office Action dated Nov. 28, 2016, 7 pages.

* cited by examiner

FIG. 2
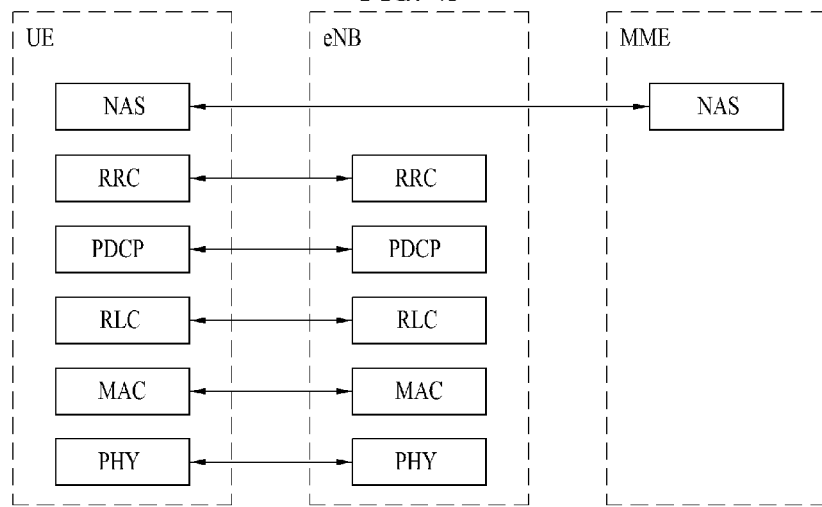
(a) control-plane protocol stack
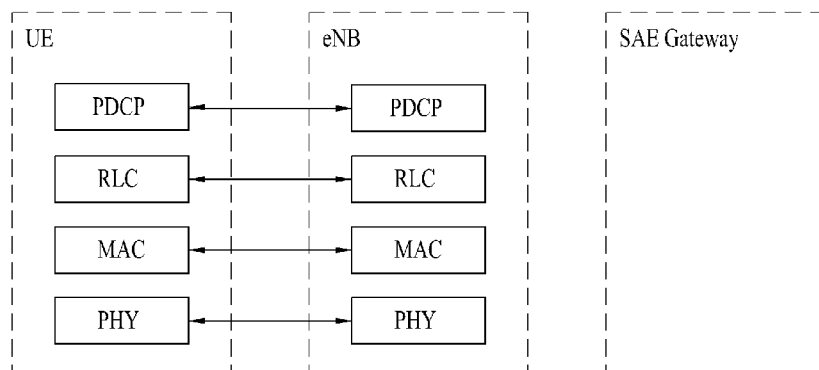
(b) user-plane protocol stack

METHOD FOR DYNAMIC ALLOCATION OF RADIO RESOURCES IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2013/003745, filed on Apr. 30, 2013, which claims the benefit of U.S. Provisional Application Ser. No. 61/640,012, filed on Apr. 30, 2012, the contents of which are hereby incorporated by reference herein in their entirety.

TECHNICAL FIELD

The present invention relates to a wireless communication system, and more particularly, to a method of dynamically allocating a radio resource in a wireless communication system and an apparatus therefor.

BACKGROUND ART

3GPP LTE ($3^{rd}$ generation partnership project long term evolution) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "$3^{rd}$ generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.44 MHz, 3 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE OF THE INVENTION

Technical Task

An object of the present invention is to provide a method of dynamically allocating a radio resource in a wireless communication system and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of transmitting an uplink signal, which is transmitted by a user equipment using a plurality of component carriers (CCs) in a wireless communication system supporting carrier aggregation, includes the steps of receiving configuration information on a second type component carrier from an eNode B via a first type component carrier and transmitting the uplink signal to the eNode B via the second type component carrier, wherein a usage for a specific subframe of the second type component carrier varies according to the configuration information.

Preferably, the first type component carrier corresponds to a carrier to which control information for the user equipment is transmitted and the second type component carrier corresponds to a carrier to which the control information for the user equipment is not transmitted.

Preferably, the second type component carrier is demodulated using a user equipment specific reference signal (cell specific reference signal (DM-RS)) or a channel state information-reference signal (CSI-RS).

Preferably, the specific subframe may correspond to a subframe configured not to transmit a specific reference signal. More preferably, specific reference signal may correspond to a common reference signal (CRS).

Preferably, the specific subframe may correspond to a downlink subframe configured not to transmit a specific reference signal.

Preferably, the specific subframe may correspond to a subframe of which a usage of a radio resource is changed via a cross-carrier scheduling using the first component carrier.

Preferably, the usage of the radio resource is indicated by a physical control channel or upper layer signaling.

Preferably, if control information used for transmitting an uplink data is not received in an uplink subframe existing prior to the specific subframe, the usage of the radio resource can be indicated using a blind decoding on the uplink subframe.

Preferably, the specific subframe is indicated by the eNode B and if uplink control information or downlink control information is not transmitted to the specific subframe, the usage of the radio resource may change.

To further achieve these and other advantages and in accordance with the purpose of the present invention, according to a different embodiment, a user equipment transmitting an uplink signal using a plurality of component carriers (CCs) in a wireless communication system supporting carrier aggregation includes a radio frequency (RF) unit and a processor, the processor configured to receive configuration information on a second type component carrier from an eNode B via a first type component carrier, the processor configured to transmit the uplink signal to the eNode B via the second type component carrier, wherein a usage for a specific subframe of the second type component carrier varies according to the configuration information.

Advantageous Effects

According to the present invention, a method of allocating a radio resource in a wireless communication system can adaptively correspond to an uplink/downlink load of a system supporting carrier aggregation in a manner of changing a radio resource in response to the uplink/downlink load.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 2 is a diagram for structures of control and user planes of radio interface protocol between a 3GPP radio access network standard-based user equipment and E-UTRAN;

BEST MODE

Mode For Invention

Figure 1:
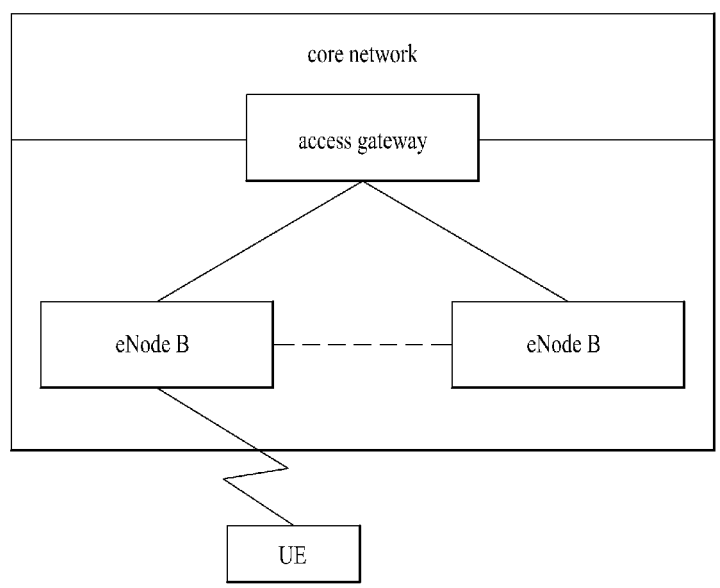
FIG. 1 is a schematic diagram of E-UMTS network structure as one example of a wireless communication system.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated DL) and SC-FDMA in uplink (hereinafter abbreviated UL). And, LTE-A (LTE-Advanced) is an evolved version of 3GPP LTE.

For clarity, the following description mainly concerns 3GPP LTE system or 3GPP LTE-A system, by which the technical idea of the present invention may be non-limited. Specific terminologies used for the following description may be provided to help the understanding of the present invention. And, the use of the specific terminology may be modified into other forms within the scope of the technical idea of the present invention.

FIG. 2 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a $1^{st}$ layer, provides higher layers with an information transfer service using a physical channel. The physical layer is connected to a medium access control layer situated above via a transport channel. Data moves between the medium access control layer and the physical layer on the transport channel. Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a $2^{nd}$ layer provides a service to a radio link control (hereinafter abbreviated RLC) layer, which is a higher layer, on a logical channel. The RLC layer of the $2^{nd}$ layer supports a reliable data transmission. The function of the RLC layer may be implemented by a function block within the MAC. PDCP (packet data convergence protocol) layer of the $2^{nd}$ layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a $3^{rd}$ layer is defined on a control plane only. The RRC layer is responsible for control of logical channels, transport channels and physical channels in association with a configuration, a re-configuration and a release of radio bearers (hereinafter abbreviated RBs). The RB indicates a service provided by the $2^{nd}$ layer for a data delivery between the user equipment and the network. To this end, the RRC layer of the user equipment and the RRC layer of the network exchange a RRC message with each other. If there is an RRC connection between the RRC layer of the user equipment and the RRC layer of the network, the user equipment is in an RRC connected mode. Otherwise, the user equipment is in an RRC idle mode. An NAS (Non-Access Stratum) layer situated at the above of an RRC layer performs such a function as session management, mobility management and the like.

A single cell consisting of an eNode B is set to one of 1.4 MHz, 3 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel). Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

Figure 3:
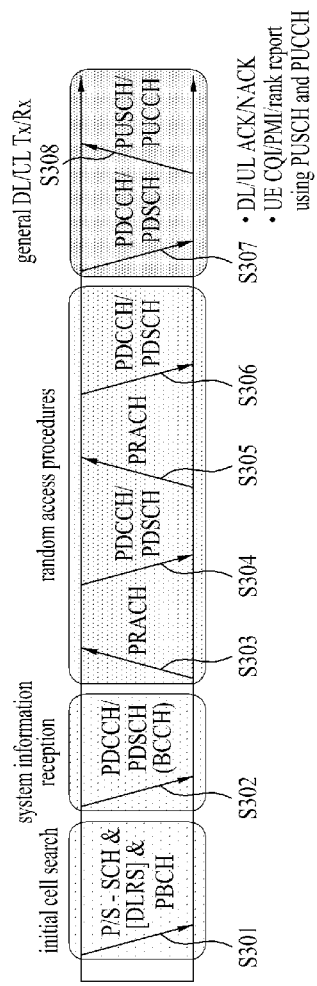
FIG. 3 is a diagram for explaining physical channels used for 3GPP system and a general signal transmission method using the physical channels.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may then obtain information such as a cell ID and the like. Subsequently, the user equipment may receive a physical broadcast channel from the eNode B and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and information carried on the physical downlink control channel (PDCCH). The user equipment may be then able to obtain detailed system information [S302].

Subsequently, the user equipment may be able to perform a random access procedure to complete the access to the eNode B [S303 to S306]. To this end, the user equipment may transmit a preamble on a physical random access channel (PRACH) [S303] and may be then able to receive a response message on PDCCH and the corresponding PDSCH in response to the preamble [S304]. In case of a contention-based random access procedure, it may be able to additionally perform a contention resolution procedure such as additional transmission of a PRACH [S305] and reception of PDCCH and the corresponding PDSCH [S306].

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. Control information transmitted to a base station by a user equipment may be commonly named uplink control information (hereinafter abbreviated UCI). The UCI may include HARQ-ACK/NACK (Hybrid Automatic Repeat and reQuest Acknowledgement/Negative-ACK), SR (Scheduling Request), CSI (Channel state information) and the like. In the preset specification, the HARQ ACK/NACK is simply called HARQ-ACK or ACK/NACK (A/N). The HARQ-ACK includes at least one selected from the group consisting of a positive ACK (simply ACK), a negative ACK (NACK), a DTX and NACK/DTX. The CSI includes CQI (Channel Quality Indication), PMI (Precoding Matrix Indication), RI (Rank Indication) information and the like. The UCI is normally transmitted via PUCCH. Yet, in case that both control information and traffic data need to be simultaneously transmitted, the UCI may be transmitted on PUSCH. Moreover, the UCI may be non-periodically transmitted via PUSCH in response to a request/indication made by a network.

Figure 4:
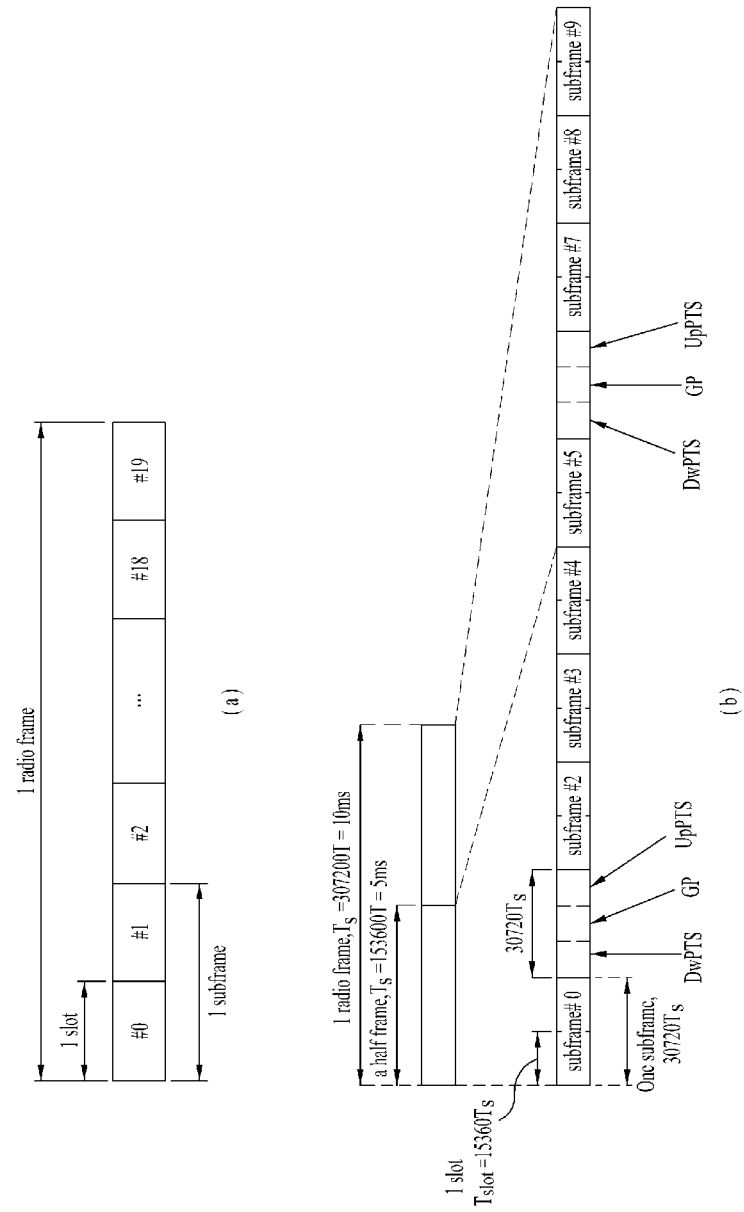
FIG. 4 is a diagram for a structure of a radio frame in 3GPP LTE.

FIG. 4 is a diagram for a structure of a radio frame in 3GPP LTE.

Referring to FIG. 4, in a cellular OFDM radio packet communication system, UL/DL (uplink/downlink) data packet transmission is performed by a unit of subframe. And, one subframe is defined as a predetermined time interval including a plurality of OFDM symbols. In the 3GPP LTE standard, a type 1 radio frame structure applicable to FDD (frequency division duplex) and a type 2 radio frame structure applicable to TDD (time division duplex) are supported.

FIG. 4(a) is a diagram for a structure of a type 1 radio frame. A DL (downlink) radio frame includes 10 subframes. Each of the subframes includes 2 slots in time domain. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and may include a plurality of resource blocks (RBs) in frequency domain. Since 3GPP LTE system uses OFDMA in downlink, OFDM symbol is provided to indicate one symbol interval. The OFDM symbol may be named SC-FDMA symbol or symbol interval. Resource block (RB) is a resource allocation unit and may include a plurality of contiguous subcarriers in one slot.

The number of OFDM symbols included in one slot may vary in accordance with a configuration of CP (cyclic prefix). The CP may be categorized into an extended CP and a normal CP. For instance, in case that OFDM symbols are configured by the normal CP, the number of OFDM symbols included in one slot may correspond to 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may correspond to 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first 2 or 3 OFDM symbols of each subframe may be allocated to PDCCH (physical downlink control channel), while the rest of the OFDM symbols are allocated to PDSCH (physical downlink shared channel).

FIG. 4(b) is a diagram for a structure of a downlink radio frame of type 2. A type 2 radio frame includes 2 half frames. Each of the half frame includes 4 normal subframes each of which includes two slots and a special subframe including a DwPTS (downlink pilot time slot), a GP (guard period) and an UpPTS (uplink pilot time slot).

In the special subframe, the DwPTS is used for initial cell search, synchronization, or channel estimation in a user equipment. The UpPTS is used for channel estimation in a base station and matching an uplink transmission synchronization of a user equipment. In particular, DwPTS is used for DL transmission and UpPTS is used for UL transmission. In particular, UpPTS is utilized for the purpose of transmitting a PRACH preamble or an SRS. The guard period is a period for eliminating interference generated in uplink due to multi-path delay of a downlink signal between uplink and downlink.

Regarding the special subframe, configuration of the special subframe is defined by a current 3GPP standard document in Table 1 in the following. Table 1 shows DwPTS and UpPTS in case of $T_s=1/(15000\times2048)$ and remaining area is configured as the guard period.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | | |
| 5 | $6592 \cdot T_s$ | $4384 \cdot T_s$ | $5120 \cdot T_s$ | $20480 \cdot T_s$ | $4384 \cdot T_s$ | $5120 \cdot T_s$ |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

Meanwhile, Table 2 in the following shows a structure of a type 2 radio frame, i.e., UL/DL subframe configuration.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 2, 'D' indicates a DL subframe, 'U' indicates a UL subframe, and 'S' indicates a special subframe. And, Table 2 also shows DL-UL switching periodicity in the UL/DL subframe configuration of each system.

The aforementioned structure of a radio frame is just an example. The number of subframes included in a radio frame, the number of slots included in a subframe and the number of symbols included in a slot can change in various ways.

Figure 5:
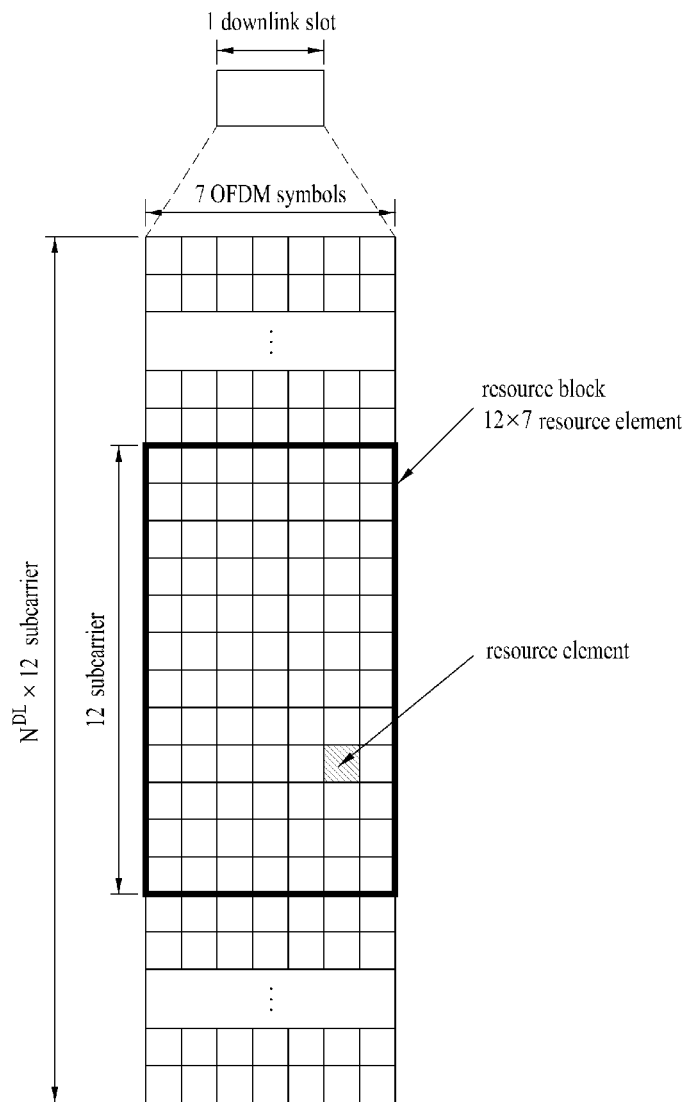
FIG. 5 is a diagram for one example of a resource grid for a downlink slot.

FIG. 5 is a diagram for one example of a resource grid for a downlink slot.

Referring to FIG. 5, a downlink slot includes $N_{symb}^{DL}$ OFDM symbol in time domain and includes $N_{RB}^{DL}$ resource block in frequency domain. Since each resource block includes $N_{sc}^{RB}$ subcarriers, a downlink slot includes $N_{RB}^{DL} \times N_{sc}^{RB}$ subcarriers in frequency domain. In FIG. 5, although it is depicted as a downlink slot includes 7 OFDM symbols and a resource block includes 12 subcarriers, by which the present invention may be non-limited. For instance, the number of OFDM symbol included in a downlink slot may vary depending on a length of a cyclic prefix (CP).

Each element on a resource grid is called a resource element (RE). One resource element is indicated by one OFDM symbol index and one subcarrier index. One RB includes $N_{symb}^{DL} \times N_{sc}^{RB}$ resource elements. The number ($N_{RB}^{DL}$) of resource block depends on a downlink transmission bandwidth configured in a cell.

Figure 6:
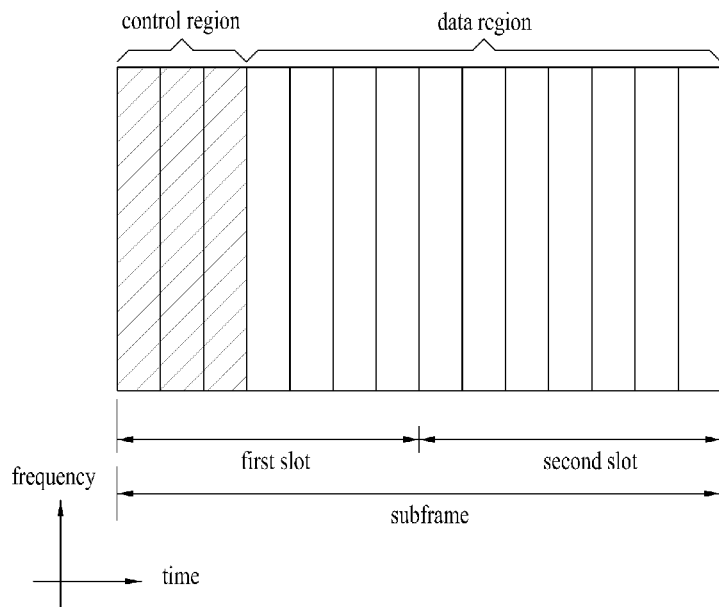
FIG. 6 is a diagram for an example of a structure of a downlink subframe.

FIG. 6 is a diagram for an example of a structure of a downlink subframe.

Referring to FIG. 6, maximum 3(4) OFDM symbols situated at a head part of a first slot of one subframe correspond to a control region to which control channels are assigned. The rest of OFDM symbols correspond to a data region to which PDSCH (physical downlink shared channel) is assigned. Examples of DL control channels used by LTE may include PCFICH (Physical Control Format Indicator Channel), PDCCH (Physical Downlink Control Channel), PHICH (Physical hybrid automatic repeat request indicator Channel) and the like. The PCFICH carried on a first OFDM symbol of a subframe carries the information on the number of OFDM symbols used for the transmission of control channels within the subframe. The PHICH carries HARQ ACK/NACK (hybrid automatic repeat request acknowledgement/negative acknowledgement) signal in response to an UL transmission.

Control information carried on PDCCH is called downlink control information (hereinafter abbreviated DCI). The DCI includes resource allocation information and different control information for a user equipment or a user equipment group. For instance, the DCI includes DL/UL scheduling information, a UL transmit (Tx) power control command and the like.

PDCCH is able to carry a transmission format and resource allocation information of DL-SCH (downlink shared channel), a transmission format and resource allocation information of UL-SCH (uplink shared channel), paging information on PCH (paging channel), system information on DL-SCH, resource allocation information of an upper layer control message such as a random access response transmitted on PDSCH, a transmit power control command set for individual user equipments within a user equipment (UE) group, a transmit power control command, activation indication information of VoIP (voice over IP) and the like. A plurality of PDCCHs can be transmitted in a control region and a user equipment is able to monitor a plurality of the PDCCHs. PDCCH is transmitted on an aggregation of a plurality of contiguous control channel elements (CCEs). CCE is a logical assignment unit used to provide PDCCH with a code rate in accordance with a state of a radio channel. CCE corresponds to a plurality of REGs (resource element groups). A format of PDCCH and the number of available bits of PDCCH are determined by the number of the CCEs. A base station determines PDCCH format in accordance with DCI to transmit to a user equipment and attaches CRC (cyclic redundancy check) to control information. The CRC is masked with an identifier (e.g., RNTI (radio network temporary identifier)) in accordance with an owner or usage of PDCCH. If the PDCCH is provided for a specific user equipment, the CRC can be masked with an identifier of the corresponding user equipment, i.e., C-RNTI (i.e., Cell-RNTI). As a different example, if the PDCCH is provided for a paging message, the CRC can be masked with a paging identifier (e.g., P-RNTI (Paging-RNTI)). If the PDCCH is provided for system information, and more particularly, for a system information block (SIB), the CRC can be masked with a system information identifier (e.g., SI-RNTI (system information-RNTI). If the PDCCH is provided for a random access response, the CRC can be masked with RA-RNTI (random access-RNTI).

Figure 7:
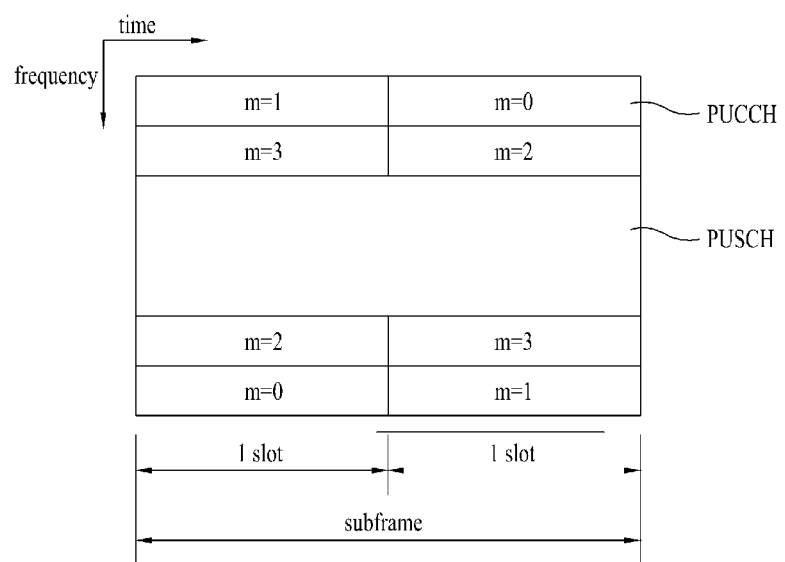
FIG. 7 is a diagram for a structure of an uplink subframe in LTE system.

FIG. 7 is a diagram for a structure of an uplink subframe in LTE system.

Referring to FIG. 7, an UL subframe includes a plurality (e.g., 2 slots) of slots. A slot may include different number of SC-FDMA symbols depending on a length of a CP. A UL subframe may be divided into a data region and a control region in frequency domain. The data region includes PUSCH and is used to transmit a data signal such as audio and the like. The control region includes PUCCH and is used to transmit uplink control information (UCI). PUCCH includes an RB pair situating at both ends of the data region on a frequency axis and hops on a slot boundary.

The PUCCH can be used to transmit following control information.

- SR (scheduling request): information used to request UL-SCH resource. This information is transmitted using OOK (on-off keying) scheme.
- HARQ ACK/NACK: a response signal transmitted in response to a DL data packet on PDSCH. This information indicates whether a DL data packet is successfully received. ACK/NACK 1 bit is transmitted in response to a single DL codeword. ACK/NACK 2 bits are transmitted in response to two DL codewords.
- CSI (channel state information): feedback information for a DL channel. CSI includes a CQI (channel quality indicator) and MIMO (multiple input multiple output)-related feedback information includes an RI (rank indicator), a PMI (precoding matrix indicator), a PTI (precoding type indicator) and the like. 20 bits are used per a subframe.

The amount of control information (UCI) capable of being transmitted by a user equipment in a subframe depends on the number of SC-FDMA available for transmitting the control information. The SC-FDMA available for transmitting the control information indicates remaining SC-FDMA symbols except SC-FDMA symbol used for transmitting a reference signal in the subframe. In case of a subframe to which an SRS (sounding reference signal) is set, a last SC-FDMA of the subframe is also excluded from the available SC-FDMA. A reference signal is used for coherent detection of PUCCH.

Figure 8:
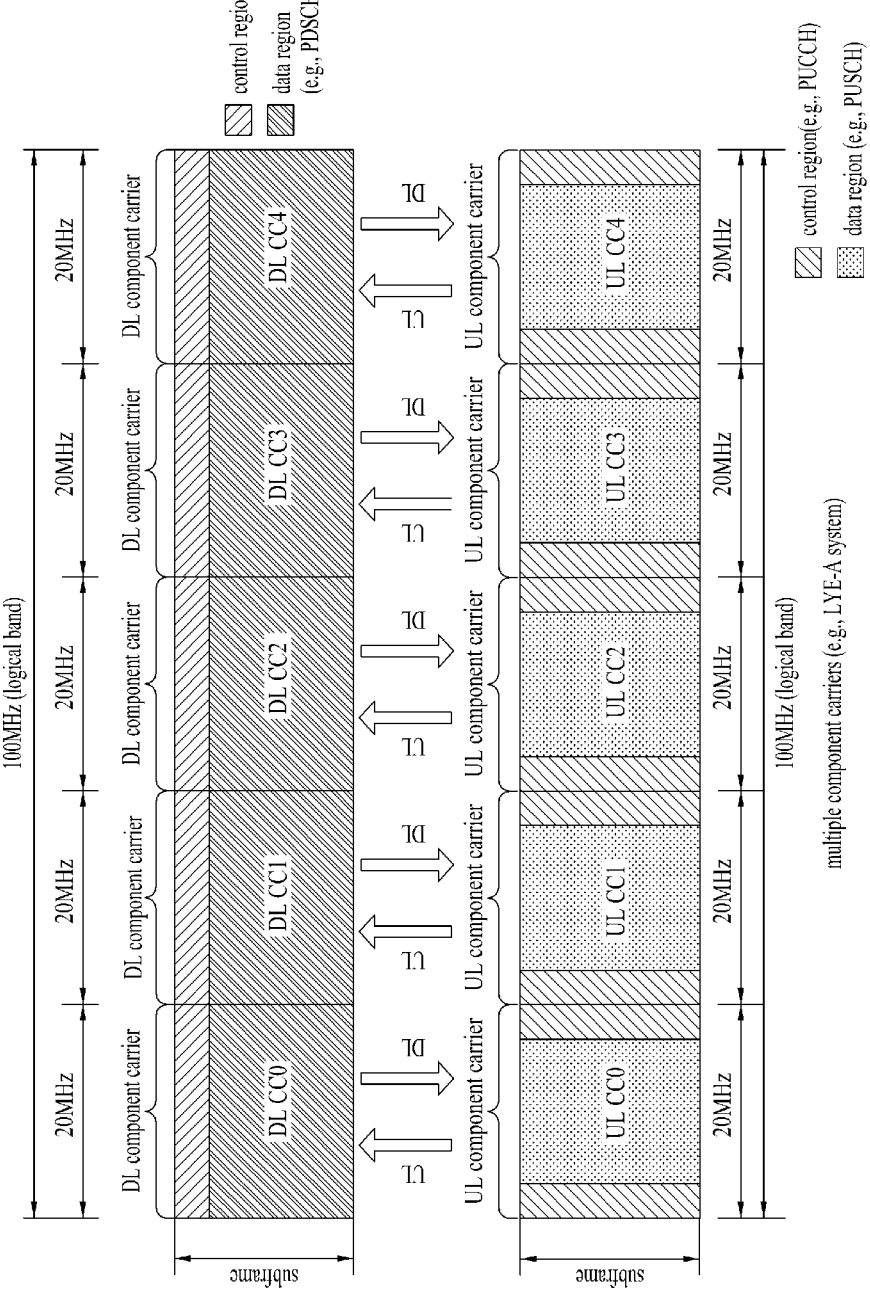
FIGS. 8 and 9 are diagrams for a carrier aggregation (CA) communication system.

FIG. 8 is a diagram for an example of a carrier aggregation (CA) communication system.

Referring to FIG. 8, it is able to support a wider uplink/downlink bandwidth in a manner of aggregating a plurality of uplink/downlink component carriers (CCs). Each of a plurality of the CCs can be adjacent or non-adjacent with each other in frequency domain. A bandwidth of each component carrier can be independently determined An asymmetrical carrier aggregation where the number of UL CC and the number of DL CC are different from each other is also possible. Meanwhile, it is able to configure control information to be transceived on a specific CC only. This sort of specific CC is called a primary CC (PCC) and remaining CC can be called a secondary CC (SCC). The PCC can be used for a user equipment to perform an initial connection establishment process or a connection re-establishment process. The PCC may indicate a cell indicated by a handover process. The SCC can be configured after an RRC connection is established and can be used to provide an additional radio resource. As an example, when a cross-carrier scheduling (or cross-CC scheduling) is applied, PDCCH used for DL allocation is transmitted on a DL CC #0 and a corresponding PDSCH can be transmitted on a DL CC #2. A terminology "component carrier" can be replaced with a different equivalent terminology (e.g., carrier, cell and the like).

For a cross-CC scheduling, a CIF (carrier indicator field) is used. Configuration for presence or non-presence of a CIF in PDCCH can be semi-statically and UE-specifically (or UE group-specifically) enabled by upper layer signaling (e.g., RRC signaling). A basic of PDCCH transmission can be summarized as follows.

CIF disabled: PDCCH on a DL CC allocates a PDSCH resource on the same DL CC and a PUSCH resource on a solely linked UL CC.
No CIF
CIF enabled: PDCCH on a DL CC can allocate a PDSCH or PUSCH resource on a single DL/UL CC among a plurality of aggregated DL/UL CCs using a CIF.
LTE DCI format extended to have CIF
CIF (if configured) is a fixed x-bit field (e.g., x=3)
CIF (if configured) is fixed irrespective of a DCI format size If a CIF exists, an eNode B can allocate a monitoring DL CC (set) to reduce complexity of blind detection of a user equipment side. For PDSCH/PUSCH scheduling, a user equipment can perform PDCCH detection/decoding on the corresponding DL CC only. And, an eNode B can transmit PDCCH on the monitoring DL CC (set) only. The monitoring DL CC set can be set by a UE-specific, a UE group-specific, or a cell-specific scheme.

Figure 9:
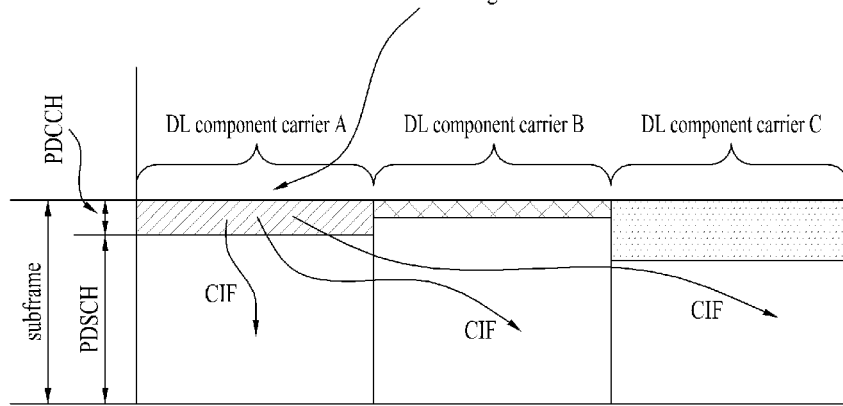

FIG. 9 shows an example of a case that 3 DL CCs are aggregated with each other and a DL CC A is configured as a monitoring DL CC. If a CIF is disabled, each DL CC can transmit PDCCH, which schedules PDSCH of each DL CC, without the CIF according to a LTE PDCCH rule. On the contrary, if the CIF is enabled by upper layer signaling, it is able to transmit PDCCH, which schedules not only PDSCH of the DL CC A but also PDSCH of a different DL CC, using the CIF. PDCCH is not transmitted on a DL CC B and a DL CC C, which are not configured as the monitoring DL CC.

As mentioned in the foregoing description, in 3GPP LTE/LTE-A system, first n number of OFDM symbols of a subframe are used to transmit PDCCH, PHICH, PCFICH and the like corresponding to physical channels configured to transmit various control information and remaining OFDM symbols are used to transmit PDSCH. The number of symbols used to transmit a control channel in each subframe is dynamically delivered to a user equipment via such a physical channel as PCFICH and the like or is semi-statically delivered to the user equipment via RRC signaling. In this case, the n value can be configured by 1 to maximum 4 symbols according to a subframe characteristic and a system characteristic (FDD/TDD system bandwidth and the like). Meanwhile, in a legacy LTE system, PDCCH corresponding to a physical channel configured to transmit DL/UL scheduling and various control information has a limit of being transmitted via a restricted OFDM symbol(s) and the like. Hence, instead of a control channel structure transmitting the DL/UL scheduling and various control information via the OFDM symbols separated from PDSCH such as a legacy PDCCH, it is able to introduce an enhanced PDCCH (E-PDCCH), which is more freely multiplexed by PDSCH and FDM/TDM scheme.

Hence, in environment to which a carrier aggregation (CA) scheme is applied, the present invention proposes a method of dynamically changing a predetermined radio resource usage (e.g., an UL resource or a DL resource) in accordance with a change of a load state of a system for the purpose of a DL or UL communication.

In case of a LTE system (Rel-8/9/10), a reference signal and a physical control channel are transmitted in a subframe configured for the purpose of DL on a specific cell or a component carrier (CC). Based on this, legacy UEs are guaranteed transmission of a physical DL/UL data channel performed via the specific cell (i.e., backward compatibility). For instance, the reference signal may correspond to one of a CRS, a CSI-RS and a DM-RS and the physical control channel may correspond to one of PDCCH, PCFICH and PHICH in the present invention, by which the present invention may be non-limited.

Yet, in a future system, it is able to introduce a cell or a component carrier (CC) of a newly defined form which is defined for the purpose of mitigating inter-cell interference problem, enhancing expandability of a cell or a component carrier (CC), increasing adaptability of an advanced technology and the like. In particular, it may introduce a cell or a component carrier (CC) of a newly defined form on which a part or all of the physical channel or the reference signal used to be transmitted in the aforementioned cell or the component carrier (CC) backward compatible with the legacy UEs is not transmitted. For clarity of explanation, this type of cell or component carrier (CC) is defined as a new carrier type (NCT) in the present invention.

In particular, unlike the type of the cell or the type of the component carrier (CC) compatible with the legacy UE, transmission of a CRS of high density can be basically omitted or reduced in the NCT corresponding to the newly defined type of the cell or the component carrier (CC).

And, overhead of a reference signal can be reduced or reception performance of a physical channel can be enhanced in the NCT in a manner of making a physical channel reception and channel estimation operation to be performed based on a CSI-RS capable of being configured with a relatively low density compared to a UE-specifically transmitted DM-RS or a CRS transmission. For instance, in the NCT, a physical channel reception operation can be configured to be performed using DL data transmission modes (e.g., TM mode #8, TM mode #9) operating based on a DM-RS only among legacy DL data transmission modes (TMs).

And, a synchronization signal (e.g., PSS or SSS) configured to obtain synchronization on time/frequency resource domain or various reference signals configured to estimate a channel (e.g., RRM or RLM) between an eNode B and a user equipment can be transmitted in the NCT. For instance, a synchronization signal transmitted in the NCT can be implemented in a structure form identical to that of a synchronization signal of a legacy system and may be implemented in a different structure form as well.

In addition, a CRS can be transmitted in the NCT to demodulate a synchronization signal. In this case, the CRS can be transmitted based on at least one selected from the group consisting of a predetermined specific period, a specific position on frequency domain, a resource on a specific antenna port and a specific sequence resource. For instance, the CRS transmitted to demodulate the synchronization signal can be defined not to be used for demodulating a physical control channel or a physical data channel.

Hence, in environment to which a carrier aggregation scheme is applied, the present invention proposes a method of dynamically changing a predetermined radio resource usage in accordance with a change of a load state of a system. The schemes proposed by the present invention can be extensively applied to both a FDD system and a TDD system to which the carrier aggregation scheme is applied. And, the schemes proposed by the present invention can be extensively applied to both a case of applying a cross-carrier scheduling (CCS) scheme and a case (e.g., self-scheduling scheme) of not applying the CSS scheme in the environment to which the carrier aggregation scheme is applied. In the present invention, a radio resource can be configured by a predefined unit. As an embodiment, the predefined unit may have a form of a subframe, a resource block (RB) or the like.

Figure 10:
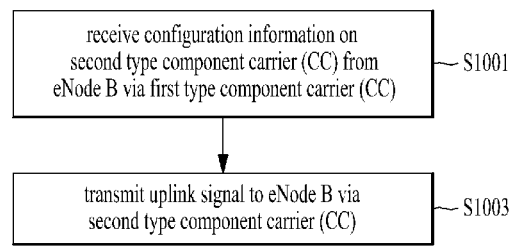
FIG. 10 is a flowchart for a method of dynamically allocating a radio resource according to one embodiment of the present invention.

FIG. 10 is a flowchart for a method of dynamically allocating a radio resource in a wireless communication system supporting carrier aggregation according to one embodiment of the present invention.

Referring to FIG. 10, an eNode B transmits configuration information on a second type component carrier via a first type component carrier (CC). Hence, a user equipment receives the configuration information on the second type component carrier from the eNode B via the first type component carrier (CC) [S1001].

According to the present invention, in case of dynamically changing a predetermined radio resource usage in accordance with a load state change of a system under environment to which carrier aggregation scheme is applied, it may make a downlink radio resource region to which a predefined reference signal is not transmitted to be used for the purpose of the dynamic change only among the radio resource regions configured for a legacy downlink usage on a specific cell or a component carrier (cc).

For instance, the predefined reference signal may correspond to at least one of a common reference signal (CRS) and a non-zero power CSI-RS and may effectively mitigate a problem of inter-cell interference in a manner of dynamically changing a usage of a radio resource on a specific cell between eNode Bs using the specific cell of an identical frequency band by carrier aggregation scheme. So far, a specific cell of a frequency band has been explained. Yet, it is apparent that the present invention can also be applied to a case that a usage of a radio resource on a component carrier (CC) is dynamically changed between eNode Bs using a component carrier (CC) of an identical frequency band by carrier aggregation scheme.

And, in case of an NCT, a CRS of a limited usage can be transmitted based on a predetermined specific period, a specific position on frequency domain, a resource on a specific antenna port or a specific sequence resource. For instance, a CRS used for demodulating a synchronization signal can be transmitted based on a predetermined specific period. Hence, according to the present invention, CRS transmission may not be performed on timing of a specific downlink subframe of an NCT. Hence, a radio resource region (i.e., downlink subframes) in which the CRS transmission is not performed can be used for the purpose of the dynamic change only.

Or, according to the preset invention, among radio resource regions configured for the purpose of a legacy downlink on a specific cell or a component carrier (CC), a radio resource region used for downlink or uplink communication to which a predefined reference signal is not transmitted can be used for the purpose of a dynamic change only. In particular, according to the present invention, among the radio resource regions configured for the purpose of legacy downlink on a specific cell or a component carrier (CC), a radio resource region used for at least one of downlink and uplink communication to which a predefined reference signal (e.g., at least one of a CRS and a non-zero power CSI-RS) is not transmitted can be used for a purpose (hereinafter, flexible resource) of the dynamic change only. In particular, it is able to configure the radio resource regions to which the predefined reference signal (e.g., at least one of a CRS and a non-zero power CSI-RS) is transmitted to be used for a purpose of a predetermined usage (e.g., downlink communication) or a purpose (hereinafter a static resource) configured based on a predefined radio resource usage configuration method.

Hence, for instance, a flexible resource according to the present invention can be defined by one of a resource used for a purpose different from a purpose of a resource on a SIB, a resource used for a purpose different from a purpose configured on a previous radio resource reconfiguration period interval, a resource used for a purpose different from a purpose on a predefined uplink/downlink reference HARQ timeline, and a resource used for a purpose different from a purpose of a predefined uplink/downlink reference UL-DL configuration. The uplink/downlink reference HARQ timeline and the uplink/downlink reference UL-DL configuration defined by the present invention are configured to stably perform a UL HARQ or a DL HARQ irrespective of a usage change of a radio resource.

For instance, a DL reference HARQ timeline or a DL reference UL-DL configuration can be defined by a HARQ timeline satisfying a union (or an intersection) of DL subframes of candidate UL-DL configurations capable of changing a usage. Or, the DL reference HARQ timeline or the DL reference UL-DL configuration can be defined by a HARQ timeline or a UL-DL configuration satisfying an intersection of the DL subframes of the candidate UL-DL configurations capable of changing a usage.

And, a UL reference HARQ timeline or a UL reference UL-DL configuration can be defined by a HARQ timeline satisfying a union of UL subframes of candidate UL-DL configurations capable of changing a usage. Or, the UL reference HARQ timeline or the UL reference UL-DL configuration can be defined by a HARQ timeline or a UL-DL configuration satisfying an intersection of the UL subframes of the candidate UL-DL configurations capable of changing a usage.

And, a static resource according to the present invention can be defined by one of a resource used for a purpose identical to a purpose of a resource on a SIB, a resource used for a purpose identical to a purpose configured on a previous radio resource reconfiguration period interval, a resource used for a purpose identical to a purpose on a predefined uplink/downlink reference HARQ timeline, and a resource used for a purpose identical to a purpose of a predefined uplink/downlink reference UL-DL configuration.

In addition, it is able to implicitly indicate a usage of a subframe of a specific position based on a relation (or configuration) between a position of a subframe used for the purpose of DL and a position of a subframe used for the purpose of a static usage. For instance, the subframe used for the purpose of DL is configured by one of a static DL subframe and a flexible DL subframe. The DL subframe used for the purpose of the static usage can be configured by the static DL subframe. Of course, it may be able to implicitly indicate a usage of a subframe of a specific position based on a relation between the position of the subframe used for the purpose of DL and a position of a subframe used for the purpose of a flexible usage (flexible DL subframe).

Hence, according to the present invention, it is able to configure a usage of a subframe (e.g., a flexible subframe) of a specific position to be recognized based on a position relation between subframes.

For instance, if a flexible subframe (e.g., an SF # (n+1)) is configured between a flexible DL subframe (e.g., an SF #n) and a static DL subframe (e.g., an SF (n+2)) or a flexible subframe (i.e., the SF # (n+1)) is configured between the static DL subframe (i.e., the SF #n) and the static DL subframe (i.e., the SF # (n+2)), a usage of the flexible subframe can be implicitly indicated as a usage of DL.

This is because, if it is assume that the flexible subframe (SF # (n+1)) is used for the purpose of UL, it should consider applying a timing advance (TA). In particular, if the TA is applied, a part of OFDM symbols may be overlapped with each other between the flexible subframe (SF # (n+1)) and a previous flexible DL subframe to which propagation delay is applied or the static DL subframe (i.e., SF #n). Hence, it is able to configure an eNode B to inform a UE of at least one of whether to apply the scheme proposed by the present invention and information on a rule via a predefined signal (e.g., a physical layer signal or upper layer signal). So far, a case that a usage of a subframe of a specific position is configured for the purpose of DL has been explained. Yet, it is apparent that the present invention can also be applied to a case that the usage of the subframe of the specific position is configured for the purpose of UL.

Or, according to the present invention, it is able to configure all radio resource regions set for the purpose of legacy UL on a specific cell or a component carrier (CC) to be used for the purpose of a dynamic change or it is able to configure a part of predefined resource regions to be used for the purpose of the dynamic change only among the radio resource regions set for the purpose of legacy UL. For instance, for a part of the predefined resource regions, a usage of a radio resource can be defined in advance using a physical layer signal or an upper layer signal.

In addition, according to the present invention, in case of dynamically changing a predetermined usage of a radio resource in accordance with a load state change of a system in environment to which a carrier aggregation scheme is applied, it is able to configure a usage of a radio resource of a cell, which is cross-carrier scheduled from a specific scheduling cell defined based on an upper layer signal in advance, to be dynamically changed only. Or, it is able to configure a usage of a radio resource of a component carrier (e.g., SCC), which is cross-carrier scheduled from a specific component carrier (e.g., DL PCC, UL PCC) defined based on a upper layer signal in advance, to be dynamically changed only.

In this case, according to the present invention, the radio resource of the specific scheduling cell or the radio resource of the component carrier can be used for a purpose identical to a previously configured purpose. A change of the usage of the radio resource of the cell, which is cross-carrier scheduled from the scheduling cell, or a change of the usage of the radio resource of the component carrier (CC) can be performed based on a predefined specific field of a physical control channel or an upper layer signal. For instance, the usage of the radio resource can be changed in a manner of reusing such a field as CIF, DAI, UL index and the like of the physical control channel or designing a new field of the corresponding usage. In order to perform the change of the usage of the radio resource with a relatively longer period compared to a physical channel-based scheme, it may also use upper layer signaling.

Moreover, according to the present invention, in order to prepare a case that a usage of a radio resource of a cell, which is cross-carrier scheduled from a specific scheduling cell, is dynamically changed or a case that a usage of a radio resource of a component carrier (CC), which is cross-carrier scheduled from a specific component carrier (CC), is dynamically changed, it may limit on a radio resource region in which the usage of the radio resource is changed. For instance, a range of a radio resource in which the change of the usage of the radio resource is actually performed on the cross-carrier scheduled cell can be limited to the aforementioned DL radio resource region to which a predefined reference signal (e.g., at least one of a CRS and a non-zero power CSI-RS) is not transmitted or a radio resource region configured for the purpose of legacy UL communication.

The user equipment transmits a UL signal to the eNode B on the second type component carrier which is configured via the first component carrier according to the aforementioned scheme proposed by the present invention [S1003].

Figure 11:
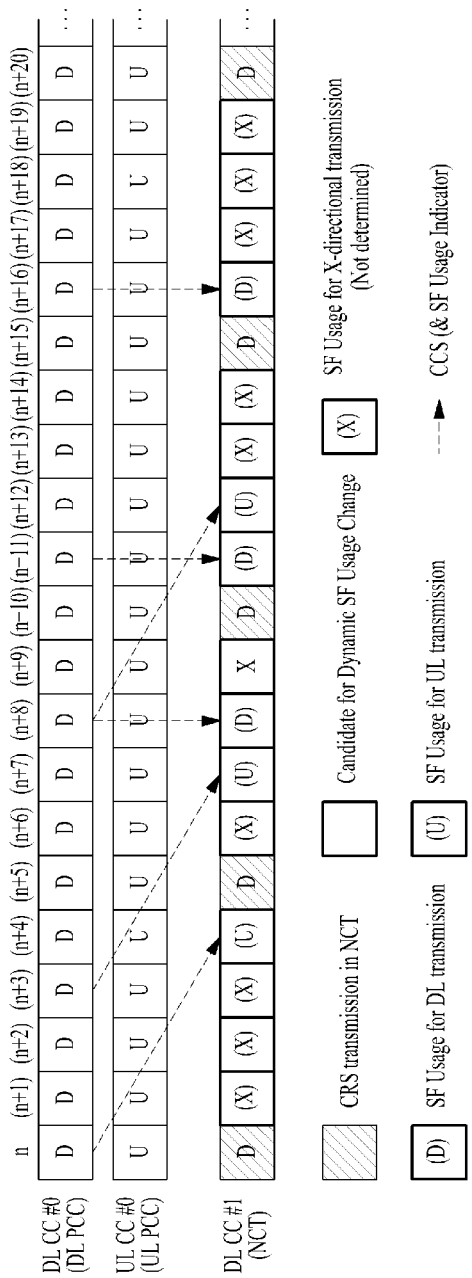
FIG. 11 is a diagram for one embodiment of the present invention performed under a FDD system.

FIG. 11 is a diagram for one embodiment of the present invention performed under a FDD system.

Referring to FIG. 11, it explains a case of using downlink subframes to which a predefined reference signal is not transmitted only as a usage of dynamic change according to the aforementioned present invention under a FDD system. In this case, the total number of component carrier (CC) allocated by an eNode B to a specific user equipment via an upper layer signal corresponds to 3. In this case, assume that the component carriers (CC) include a DL CC #0 (i.e., a DL PCC), a UL CC #0 (i.e., a UL PDCC) and a DL CC #1 (i.e., a NCT).

In FIG. 11, assume that a reference signal corresponds to a CRS and the CRS is transmitted to demodulate a synchronization signal in the NCT. In this case, a period of the CRS transmitted in the NCT is set to 5 ms.

Hence, according to the aforementioned present invention, assume that downlink subframes to which the CRS is not transmitted in the NCT are used for the purpose of dynamic change and downlink/uplink communication in the NCT is performed based on cross-carrier scheduling of a scheduling cell predetermined via an upper layer signal or a component carrier (CC) (i.e., a DL CC #0). In addition, assume that a configuration of a radio resource usage in the NCT is performed based on a specific field of a predefined physical control channel.

Hence, according to the present invention, in order for an eNode B to configure a radio resource of a timing of an SF #n in the NCT as a downlink usage, the eNode B transmits an SF usage indicator on the timing of the SF #n of the scheduling cell or the component carrier (CC) (i.e., the DL CC #0). And, in order for the eNode B to configure the radio resource of the timing of an SF #n in the NCT as an uplink usage, the eNode B transmits a scheduling cell or a component carrier (CC).

As mentioned in the foregoing description, in case of configuring a radio resource as a uplink usage, the eNode B can transmit a radio resource usage indicator (SF usage indicator) to the user equipment on a timing of an SF # (n−4) of the scheduling cell (i.e., the DL CC #0) in consideration of UL control information (UL grant) and an UL HARQ timeline for UL data transmission corresponding to the UL control information.

Figure 12:
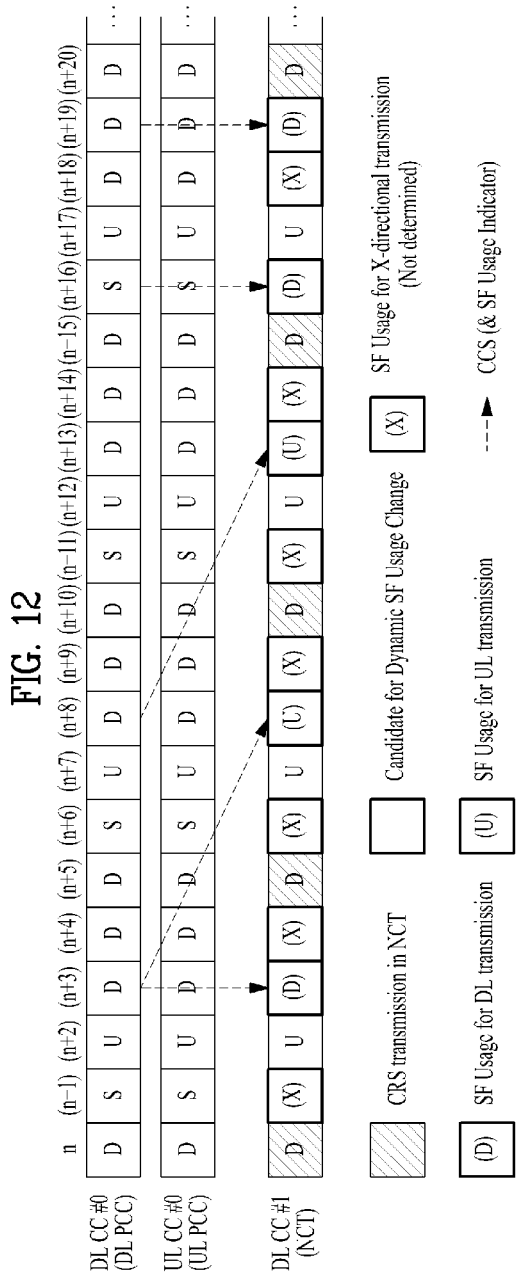
FIG. 12 is a diagram for one embodiment of the present invention performed under a TDD system.

FIG. 12 is a diagram for one embodiment of the present invention performed under a TDD system.

Referring to FIG. 11, it explains a case of using downlink subframes to which a predefined reference signal is not transmitted as a usage of dynamic change only according to the aforementioned present invention under a TDD system.

In FIG. 12, assume that the number of component carrier (CC) and characteristic of the component carrier allocated by an eNode B to a specific user equipment via an upper layer signal are identical to those of the component carrier described earlier in FIG. 11. And, in FIG. 12, assume that UL-DL configuration according to a cell or a component carrier (CC) is identical to each other. Specifically, assume that the UL-DL configuration is set to a UL-DL configuration #2.

In FIG. 12, assume that a reference signal corresponds to a CRS and the CRS is transmitted to demodulate a synchronization signal in the NCT. In this case, a period of the CRS transmitted in the NCT is set to 5 ms.

Hence, according to the aforementioned present invention, downlink subframes to which the CRS is not transmitted in the NCT are used only for the purpose of dynamic change and downlink/uplink communication in the NCT can be performed based on cross-carrier scheduling of a scheduling cell predetermined via an upper layer signal or a component carrier (CC) (e.g., a DL CC #0). In addition, a configuration of a radio resource usage in the NCT can be performed based on a specific field of a predefined physical control channel.

For instance, in order for an eNode B to configure a radio resource of a timing of an SF #n in the NCT as a downlink usage, the eNode B can transmit an SF usage indicator on the timing of the SF #n of the scheduling cell or the component carrier (CC) (e.g., the DL CC #0). And, in order for the eNode B to configure the radio resource of the timing of an SF #n in the NCT as an uplink usage, the eNode B can transmit a subframe usage indicator in a nearest DL subframe in which a previous (legacy) UL scheduling information (i.e., UL grant) is used to be transmitted including an SF # (n−4) timing.

In addition, according to the present invention, in case of dynamically changing a predetermined usage of a radio resource according to a load state change of a system, an eNode B may inform a user equipment of information on a radio resource region in which the dynamic change is likely to be performed.

For instance, the eNode B can inform the user equipment of the information on the radio resource region in which the dynamic change is likely to be performed via a physical control channel or an upper layer signal. According to the present invention, having received the information on the radio resource region, the user equipment may perform a blind decoding or monitoring operation for the physical control channel (e.g., PDCCH, E-PDCCH) on timing that predefined corresponding radio resource usage configuration information is transmitted. Hence, the user equipment can determine the usage of the corresponding radio resource according to whether control information for DL communication (i.e., DL grant) or control information for UL communication (i.e., UL grant) is received.

And, the radio resource usage configuration information according to the present invention can be transmitted in a subframe configured for a DL usage or a subframe configured for a UL usage. In this case, if the radio resource usage configuration information is transmitted in both the subframe configured for the DL usage and the subframe configured for the UL usage, the user equipment should perform a blind decoding or monitoring not only in the DL subframe but also in the UL subframe to receive the information. Moreover, the user equipment can configure the blind decoding operation, which is performed in the UL subframe to receive the radio resource usage configuration information, to be performed only when scheduling information (i.e., UL grant) configured to transmit UL data (i.e., PUSCH) in the UL subframe is not received on a predefined specific (previous) timing. In particular, as mentioned in the foregoing description, the UL subframe may be used as a usage of a DL subframe in a manner of being changed based on the radio resource usage configuration information transmitted in the UL subframe.

Additionally, according to the present invention, in order to distinguish scheduling information (e.g., DL grant, UL grant) on a radio resource region in which a usage change is likely to be performed from scheduling information on a radio resource region used for a (semi) static usage, it may use a predefined specific indicator. For instance, the aforementioned radio resource regions can be distinguished from each other in a manner of including a subframe usage indicator in scheduling information transmission.

According to the present invention, an eNode B may configure a radio resource region in which a dynamic change is like to be performed as a UL usage via an additional signal for a user equipment. For instance, the eNode B may configure the radio resource region in which the dynamic change is likely to be performed as a predefined third usage via a physical control channel or an upper layer signal. In addition, it may configure the user equipment to consider the subframe configured as the UL usage or the subframe (or a subframe of a legacy UL usage) configured as the predefined third usage as the radio resource in which the dynamic change is like to be performed via an additional signal.

For instance, having received the additional signal for the radio resource region, the user equipment performs blind decoding or a monitoring operation for a physical control channel (i.e., PDCCH, E-PDCCH) on a timing that a predefined radio resource usage configuration information is transmitted and may be then able to determine a usage of a corresponding radio resource according to whether control information (i.e., DL grant) for DL communication or control information (i.e., UL grant) for UL communication is received. Similarly, in case of performing a blind decoding operation configured to receive the radio resource usage configuration information in the subframe configured as the UL usage, a corresponding UL resource can be used for the purpose of DL communication or UL communication.

Moreover, the user equipment can configure the blind decoding operation, which is performed in the UL subframe to receive the radio resource usage configuration information, to be performed only when scheduling information (i.e., UL grant) configured to transmit UL data (i.e., PUSCH) in the UL subframe is not received on a predefined specific (previous) timing. For instance, it may configure all or a part of DL subframes to which a predefined reference signal (e.g., a CRS) is not transmitted as a radio resource region in which a dynamic change is likely to be performed via an additional signal (e.g., a physical control channel or an upper layer signal) in the NCT.

The aforementioned embodiments according to the present invention can be extensively applied to both a FDD system and a TDD system to which carrier aggregation scheme is applied. And, in environment to which the carrier aggregation scheme is applied, the embodiments of the present invention can be extensively applied to both a case that a cross-carrier scheduling scheme is applied and a case (e.g., self-scheduling method) that the cross-carrier scheduling scheme is not applied. Moreover, the embodiments of the present invention can be extensively applied to both a FDD system and a TDD system to which the carrier aggregation scheme is not applied.

In addition, the embodiments according to the present invention can also be extensively applied to a case that a communication between a UE and an eNB or a communication between a UE and a UE is performed based on an extension cell or a component carrier (CC) in environment to which the carrier aggregation scheme is applied.

And, the present invention can also be applied to a case that a usage of a radio resource on a legacy carrier or a legacy component carrier is dynamically changed according to a system load state. Additionally, the embodiments of the present invention can be configured to be limitedly applied to a case that a dynamic changing mode of a radio resource usage is set or supported only.

And, the embodiments of the present invention can also be extensively applied to a case that a specific user equipment receives data transmitted from an eNode B via a relay node or a specific user equipment designated in advance (i.e., UE relaying scheme).

In addition, the embodiments of the present invention can be performed when communication between a UE and a UE (i.e., device-to-device communication) is performed in environment to which carrier aggregation scheme is applied. Or, the embodiments of the present invention can also be extensively applied to environment to which the carrier aggregation scheme is not applied.

Figure 13:
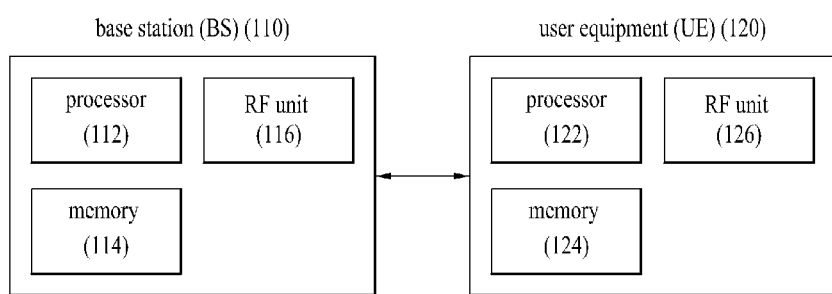
FIG. 13 is a diagram for a base station and a user equipment applicable to embodiment of the present invention.

FIG. 13 is a diagram for a base station and a user equipment applicable to embodiment of the present invention. If a relay is included in a wireless communication system, communication is performed between an eNode B and the relay in backhaul link and communication is performed between the relay and a user equipment in access link. Hence, the eNode B and the user equipment shown in the drawing can be replaced with the relay in accordance with a situation.

Referring to FIG. 13, a wireless communication system includes a base station (BS) 110 and a user equipment (UE) 120. The BS 110 includes a processor 112, a memory 114 and a radio frequency (RF) unit 116. The processor 112 can be configured to implement the proposed functions, processes and/or methods. The memory 114 is connected with the processor 112 and then stores various kinds of information associated with an operation of the processor 112. The RF unit 116 is connected with the processor 112 and transmits and/or receives a radio signal. The user equipment 122 includes a processor 122, a memory 124 and a radio frequency (RF) unit 126. The processor 122 can be configured to implement the proposed functions, processes and/or methods. The memory 124 is connected with the processor 122 and then stores various kinds of information associated with an operation of the processor 122. The RF unit 126 is connected with the processor 122 and transmits and/or receives a radio signal. The base station 110 and/or the user equipment 120 may have a single antenna or multiple antennas.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Embodiments of the present invention can be implemented using various means. For instance, embodiments of the present invention can be implemented using hardware, firmware, software and/or any combinations thereof In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method of dynamically allocating a radio resource in a wireless communication system and apparatus therefor are described with reference to examples applied to 3GPP LTE system, it may be applicable to various kinds of wireless communication systems as well as to the 3GPP LTE system.

What is claimed is:

1. A method of transmitting an uplink signal, which is transmitted by a user equipment using a plurality of component carriers (CCs) in a wireless communication system supporting carrier aggregation, comprising:
   receiving a time division duplex uplink-downlink (TDD UL-DL) configuration for a second component carrier through a physical control channel or a higher layer signaling,
   wherein the TDD UL-DL configuration indicates an uplink-downlink resource configuration of a plurality of subframes;
   receiving configuration information indicating at least one subframe among the plurality of subframes on the second component carrier from an eNode B via a first component carrier,
   wherein each of the indicated at least one subframe is a downlink subframe according to the TDD UL-DL configuration;
   if control information for the indicated at least one subframe is not received prior to the indicated at least one subframe, detecting the control information for the indicated at least one subframe by performing a blind decoding in uplink subframes indicated by the TDD UL-DL configuration; and
   when the detected control information is an uplink grant, transmitting the uplink signal to the eNode B in the indicated at least one subframe via the second component carrier.

2. The method of claim 1, wherein the second component carrier is demodulated using a user equipment specific reference signal (cell specific reference signal (DM-RS)) or a channel state information-reference signal (CSI-RS).

3. The method of claim 1, wherein each of the indicated at least one subframe corresponds to a subframe configured not to carry a specific reference signal from the eNode B.

4. The method of claim 3, wherein the specific reference signal corresponds to a common reference signal (CRS).

5. The method of claim 1, wherein each of the indicated at least one subframe corresponds to a subframe of which a usage of a radio resource is changed based on the detected control information.

6. The method of claim 1, wherein the indicated at least one subframe is indicated by the eNode B.

7. A user equipment transmitting an uplink signal using a plurality of component carriers (CCs) in a wireless communication system supporting carrier aggregation, comprising:
 a transceiver; and
 a processor configured to control the transceiver, the processor further configured to:
  receive a time division duplex uplink-downlink (TDD UL-DL) configuration for a second carrier through a physical control channel or a higher layer signaling,
  wherein the TDD UL-DL configuration indicates an uplink-downlink resource configuration of a plurality of subframes,
  receive configuration information indicating at least one subframe among the plurality of subframes on the second component carrier from an eNode B via a first component carrier,
  wherein each of the indicated at least one subframe is a downlink subframe according to the TDD UL-DL configuration,
  if control information for the indicated at least one subframe is not received prior to the indicated at least one subframe, detect the control information for the indicated at least one subframe by performing a blind decoding in uplink subframes indicated by the TDD UL-DL configuration, and
  when the detected control information is an uplink grant, transmit the uplink signal to the eNode B in the at least one subframe via the second component carrier.

* * * * *